(12) United States Patent
Ohta

(10) Patent No.: US 6,870,536 B2
(45) Date of Patent: Mar. 22, 2005

(54) IMAGE PROCESSING APPARATUS AND IMAGE PROCESSING PROGRAM

(75) Inventor: Keizo Ohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 480 days.

(21) Appl. No.: 09/986,772

(22) Filed: Nov. 9, 2001

(65) Prior Publication Data

US 2003/0038806 A1 Feb. 27, 2003

(30) Foreign Application Priority Data

Aug. 22, 2001 (JP) .................................... 2001-251591

(51) Int. Cl.[7] .............................................. G06T 17/00
(52) U.S. Cl. ...................................................... 345/473
(58) Field of Search ........................................ 345/473

(56) References Cited

U.S. PATENT DOCUMENTS 6,483,520 B1 * 11/2002 Uchi et al. .................. 345/619

OTHER PUBLICATIONS

Modeling Waves and Surf. Darwyn R. Peachey. ACM Siggraph Computer Graphics, Proceedings of the 13th annual conference on Computer graphics and interactive techniques. vol. 20 Issue 4. Aug. 1986.*

A Simple Model of Ocean Waves. Alain Fournier; William T. Reeves. ACM Siggraph Computer Graphics, Proceedings of the 13th annual conference on Computer graphics and interactive techniques. vol. 20 Issue 4. Aug. 1986.*

* cited by examiner

Primary Examiner—Mark Zimmerman
Assistant Examiner—Peter-Anthony Pappas
(74) Attorney, Agent, or Firm—Nixon & Vanderhye P.C.

(57) ABSTRACT

An image processing apparatus and an image processing program capable of sufficiently representing changes in undulations of a water surface without deforming the surface of an object. A water surface object B is so set as to be larger than a water surface area to be actually represented and to has undulations formed in the neighborhood of a boundary line portion meeting a land object A. The place position is determined so that the position of this entire water surface object B is moved at predetermined time (frame) intervals. Thus, it is possible to change in shape only the boundary portion where the water surface and the land meet, and to represent undulations of the water surface as if water is undulating. Furthermore, the shapes of polygons composing the water surface object B are not individually changed, but the entire water surface object B having a particular shape is moved. Therefore, the amount of computation in image processing necessary for representing undulations of the water surface becomes small.

10 Claims, 7 Drawing Sheets

IMAGE PROCESSING APPARATUS AND IMAGE PROCESSING PROGRAM

BACKGROUND OF THE INVENTION

1. Field of the Invention

The present invention relates to image processing apparatuses and image processing programs and, more specifically, to an image processing apparatus for generating an image representing a water surface in a game world or the like in virtual three-dimensional space, and an image processing program executed on the apparatus.

2. Description of the Background Art

Conventionally, a game machine, which is one example of computer-equipped image processing apparatuses, may display an image of a moving (undulating) surface of water such as a sea or a river. Such image is often displayed mainly with the following two schemes.

With reference to FIG. 9A and FIG. 9B, prior art is described. To begin with, in a first scheme, as shown in FIG. 9A, a flat polygon composing a water surface object B is provided thereon with a pattern that gives a feeling of undulations of the water surface. This water surface object B is placed at a fixed position with respect to a land object A, thereby representing undulations of the water surface.

Next, in a second scheme, as shown in FIG. 9B, the water surface object B is placed at a fixed position with respect to the land object A. The water surface object B is composed of a plurality of small polygons, and the vertexes of the respective polygons are fluctuated independently in a vertical direction to deform the surface of the object, thereby representing undulations of the water surface.

However, as in the first scheme described above, when the undulations of the water surface are represented only with the pattern on the surface of the object, changes in undulations at the boundary between the water surface and a land (changes on a foreshore where swash and backwash are observed) cannot be represented. Therefore, such representation is poor in expressive power, compared with the actual water surface.

On the other hand, as in the second scheme described above, when the undulations of the water surface are represented by arbitrarily deforming the surface of the object, a large number of polygons are used for composing the object, thereby requiring a sufficient data storage area, and a complex, enormous computation processing for moving the respective vertexes of the polygons. Therefore, this second scheme is not so welcome in software development requiring high-speed operation.

SUMMARY OF THE INVENTION

Therefore, an object of the present invention is to provide an image processing apparatus and an image processing program that can sufficiently represent changes in undulations of a water surface, without independently fluctuating the vertexes of polygons composing a water surface object to deform the surface of the object.

The present invention has the following features to attain the object above.

A first aspect of the present invention is directed to an image processing apparatus that outputs image data for representing a water surface in virtual space. The apparatus includes land object generating means (the corresponding component in the description of embodiment: main processor 11) water surface object generating means (main processor 11), object placing means (main processor 11), object moving means (main processor 11), object moving means (main processor 11), and image data output means (coprocessor 12).

The land object generating means generates a land object representing a land portion. The water surface object generating means generates a water surface object representing a water surface portion, the water surface portion larger than a water surface area to be displayed and having an undulating shape fixed to a predetermined area. The object placing means determines a place position of each object so that the water surface object meets the land object in a portion of the predetermined area. The object moving means moves the place position of the water surface object so that the portion meeting with the land object is changed within the predetermined area. The image data outputting means outputs the image data for representing the virtual space with each placed object.

As described above, according to the first aspect, the water surface object is so set as to be larger than a water surface area to be actually represented, and to have undulations in the neighborhood of a boundary line portion that meets the land object. The place position is determined so that the position of this entire water surface object is moved. Thus, it is possible to change in shape the boundary portion where the water surface and the land meet, thereby representing undulations of the water surface as if water is undulating. Also, since the entire water surface object is moved, the amount of computation in the image processing necessary for representing undulations of the water surface becomes small.

Preferably, the object moving means moves the place position of the water surface object so that the water surface object makes a linearly or curved, reciprocating motion.

Alternatively, the object moving means moves the place position of the water surface object so that the water surface object makes a circular motion or an elliptical motion.

Thus, it is possible to change in shape the boundary portion where the water surface and the land meet by using only a simple motion of the entire water surface object. Therefore, the computation processing required for representing undulations of the water surface becomes simplified.

Also, preferably, the water surface object has a flat surface on a portion except the predetermined area, the portion not meeting with the land object.

Thus, the portion that does not meet with the land object can be structured by a single flat polygon, thereby requiring less data amount necessary for displaying the water surface object.

Further, preferably, when a pattern is pasted on a surface of the water surface object, the object moving means moves a pasting position of the pattern in a direction reverse to a direction of moving the water surface object by an amount equal to an amount thereof.

Thus, it is possible to prevent the pattern on the surface from moving in accordance with the motion of the water surface object.

A second aspect of the present invention is directed to an image processing program for executing, on a computer, a procedure of outputting image data for representing a water surface in virtual space. The program includes a land object generating step (S64), a water surface object generating step (S64), a determining step (S74, S75), a moving step (S73), and an outputting step (S67, S68).

In the land object generating step, a land object representing a land portion is generated. In the water surface object generating step, generated is a water surface object representing a water surface portion, the water surface portion larger than a water surface area to be displayed and having an undulating shape fixed to a predetermined area. In the determining step, a place position of each object is determined so that the water surface object meets the land object in a portion of the predetermined area. In the moving step, the place position of the water surface object is moved so that the portion meeting with the land object is changed within the predetermined area. In the outputting step, the image data for representing the virtual space with each placed object is outputted.

Preferably, in the moving step, the place position of the water surface object is moved so that the water surface object makes a linearly or curved, reciprocating motion.

Alternatively, in the moving step, the place position of the water surface object is moved so that the water surface object makes a circular motion or an elliptical motion.

Alternatively, the water surface object has a flat surface on a portion except the predetermined area, the portion not meeting with the land object.

Furthermore, when a pattern is pasted on a surface of the water surface object, the moving step moves a pasting position of the pattern in a direction reverse to a direction of moving the water surface object by an amount equal to an amount thereof.

By introducing such image processing program into the computer for execution, it is possible to realize the image processing apparatus in the first aspect achieving the above effects.

These and other objects, features, aspects and advantages of the present invention will become more apparent from the following detailed description of the present invention when taken in conjunction with the accompanying drawings.

DESCRIPTION OF THE PREFERRED EMBODIMENTS

The present invention focuses attention on that changes in undulations of a water surface are easy to recognize at a boundary portion between the water surface and a land, that is, to recognize by changes in shape of a foreshore, and difficult to recognize at the other portions (for example, the center portion of a sea). Changes in shape of the boundary portion where the water surface and the land meet give people the illusion that the water surface is undulating, thereby representing undulations of the water surface.

The image processing apparatus provided by the present invention is used in a graphic system, a game machine, and others that require image representation by polygons and, in cooperation with a CPU, memory, and others composing these, realized by performing particular processing. With reference to FIG. 1 to FIG. 8, described below are the image processing apparatus and an image processing program executed on the apparatus, both provided by the present invention.

(System Environment for Realizing the Present Invention)

Figure 1:
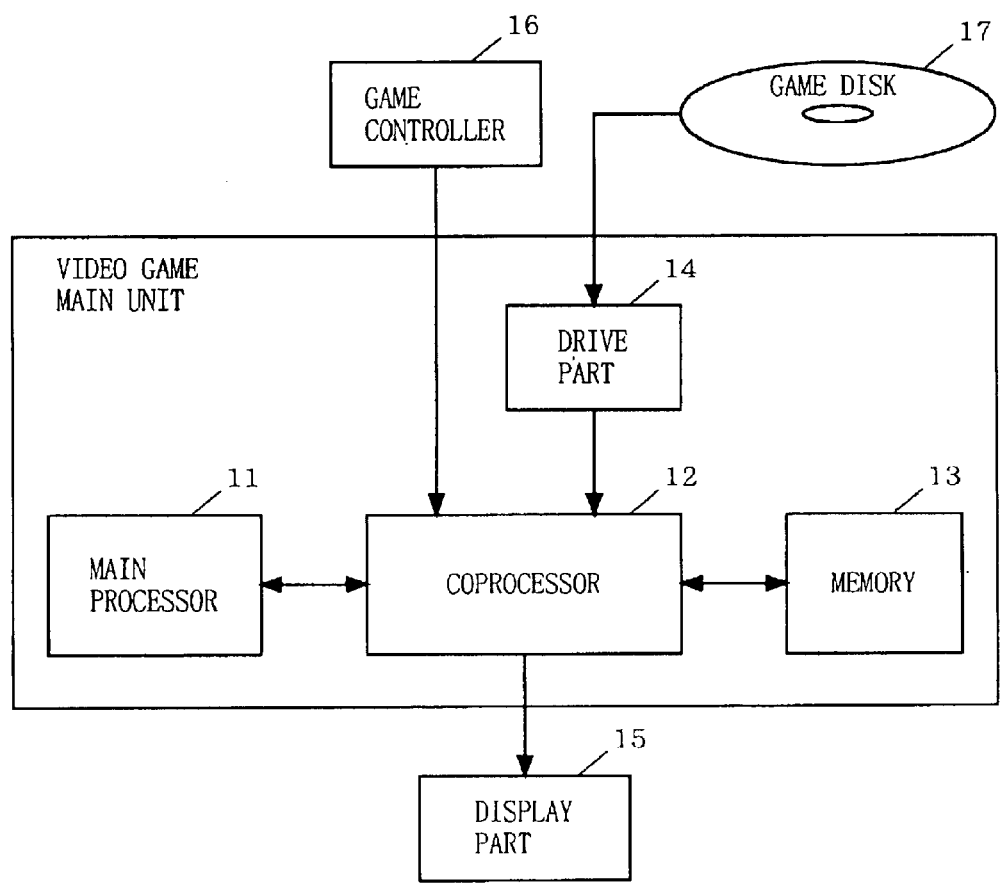
FIG. 1 is a block diagram showing an example of structure of a video game system including an image processing apparatus according to one embodiment of the present invention.

FIG. 1 shows an example of structure of a video game system including an image processing apparatus according to one embodiment of the present invention. In FIG. 1, the video game system is structured by a main unit including a main processor 11, a coprocessor 12, memory 13, and a drive part 14; a game controller 16; a display part 15; and a game disk 17. Thus, the image processing apparatus of the present embodiment is basically structured by the main processor 11, the coprocessor 12, and the memory 13.

The main processor 11 executes a game program. To the main processor 11, the coprocessor 12 is connected. The coprocessor 12 includes a bus control circuit for carrying out bus control; a signal processor for carrying out polygon coordinate transform, shading, and other processing; and a rendering processor for rasterizing polygon data on an image to be displayed and transforming the rasterized data into data format (dot data) storable in frame memory (any of them not shown). To the coprocessor 12, the drive unit 14 driving the game disk, and the memory 13 are connected. Also, to the coprocessor 12, the display part 15 is connected via a digital/analog converter (not shown) for outputting an audio signal and a video signal based on the data processed by the main processor 11. Also, to the coprocessor 12, the game controller 16 is connected.

The bus control circuit converts a command given by the main processor 11 through a bus as a parallel signal into a serial signal, and then supplies it to the game controller 16. Also, the bus control circuit converts a command given by the game controller 16 as a serial signal into a parallel signal, and then supplies it to the main processor 11. The data indicating the state of operation supplied by the game controller 16 is subjected to processing, such as being processed by the main processor 11 or temporarily stored in the memory 13. The program stored in the game disk 17 is transferred, as required, to the memory 13 for storage. The program stored in the memory 13 is executed on the main processor 11 in response to an operation supplied by the game controller 16. The coprocessor 12 makes the execution result displayed on a screen of the display part 15.

In FIG. 1, the image processing program executed on the image processing apparatus of the present invention is stored in the game disk 17, transferred to the memory 13 for storage, and executed on the main processor 11. The memory 13 stores programs and data indicated by the memory map of FIG. 2. The game disk 17 is a recording medium such as a DVD, and stores programs and data indicated by the memory map in FIG. 3.

Figure 2:
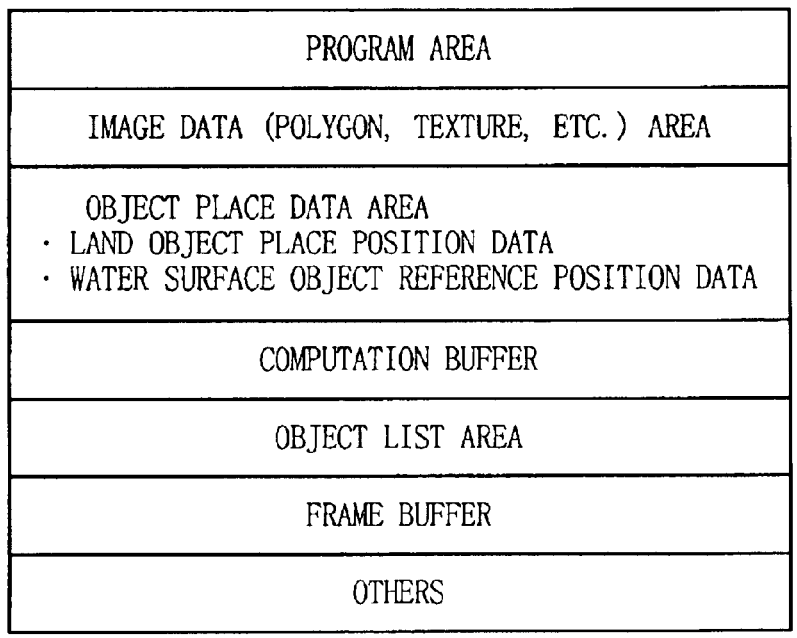
FIG. 2 is a diagram showing one example of a memory map of memory 13 in FIG. 1.
Figure 3:
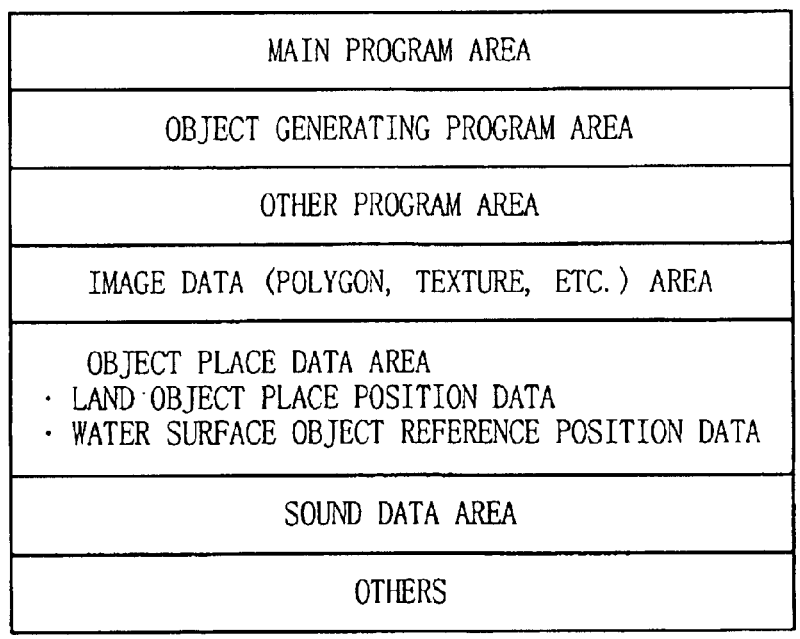
FIG. 3 is a diagram showing one example of a memory map of a game disk 17 in FIG. 1.

With reference to FIG. 2, in the memory 13, a program area stores a basic program for operating a game, and also a water surface object generating program, a land object generating program, an object placing program, a water surface object moving program, and others. An image data area stores image data (polygon data and texture image data) of objects. An object place data area stores place position data of land objects and reference position data of water surface objects. A computation buffer is a buffer for use in computing a place position of an object, for example. An object list area stores information of the objects required for composing a single frame image (specifically, the area stores an object specifying number and the information of the place position of each object). A frame buffer stores, based on the data of the object list area, the single frame's image generated by the coprocessor 12.

In the game disk 17, a main program area stores a basic program for operating the game. An object generating program area stores image processing programs including the water surface object generating program, the land object generating program, the object placing program, the water surface object moving program, and others. An other program area stores programs other than the main program and the object generating program. An image data area stores various data related to the water surface objects and the land objects (polygons, textures, and others required for game graphic display). An object place data area stores the place position data of the land objects and the reference position data of the water surface objects. A sound data area stores various data related game sound representations.

Note that the data stored in the program area, the image data area, and the object place data area of the memory 13 are transferred from the game disk 17 that stores the respective data.

(Setting a Water Surface Object)

Figure 4:
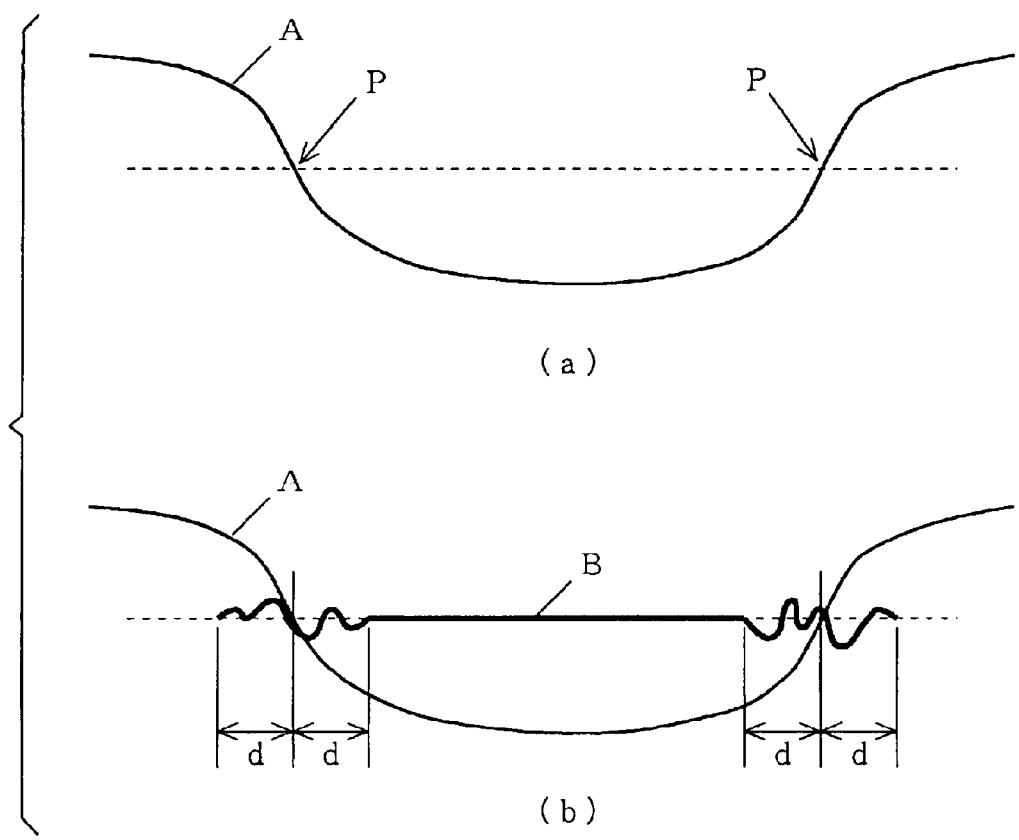
FIG. 4 shows, in vertical section, examples representing a water surface object and a land object represented virtual three-dimensional space.

With reference to FIG. 4, described next is a water surface object setting scheme (water surface object generating program) used in the present invention to represent undulations of the water surface. FIG. 4 shows, in vertical section, examples of a land object A and a water surface object B represented in virtual three-dimensional space.

Now consider a case where the water surface object is so set as to be positioned along a broken line with respect to the land object A ((a) of FIG. 4). In this case, to a predetermined area 2*d* around a boundary line P where the water surface (broken line) meets the object A, a plurality of polygons are provided for fixedly forming undulations the water surface and, to the other area, the water surface object B formed by a flat polygon is set ((b) of FIG. 4).

Figure 5:
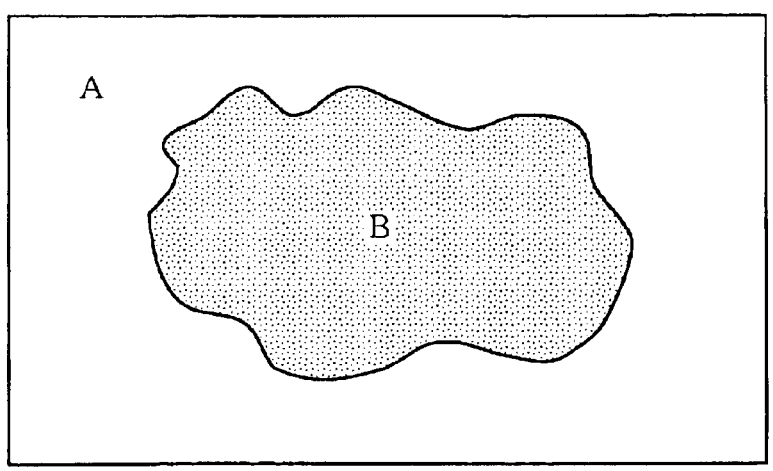
FIG. 5 is a diagram showing one example of how a land object A and a water surface object B look after hidden surface processing.

The land object and the water surface object are subjected to hidden surface processing by the coprocessor 12, as shown in FIG. 5. That is, in the water surface object B, the area outside the boundary line with the land object A (the area that lies in the land object A side) is hidden by the land object A and not displayed.

Here, the predetermined area 2*d* where undulations are formed is set to have a width more than a motion width in a water surface object moving process, which will be described later. Also, if the shape of undulations in the predetermined area 2*d* is formed at random, a line of the water's edge is irregularly represented after the hidden surface processing, which is preferable because it is natural.

As such, the water surface object used in the present invention is so set as to be larger than a water surface area to be actually represented, and also to form undulations only in the neighborhood of a portion of the boundary line where the water surface object meets the land object.

(Procedure of Executing the Image Processing Program)

Further referring to FIG. 6 to FIG. 8, described next are, in the video game system shown in FIG. 1, how the image processing program is executed by the image processing apparatus and how the processed image is displayed on a screen of the display.

Figure 6:
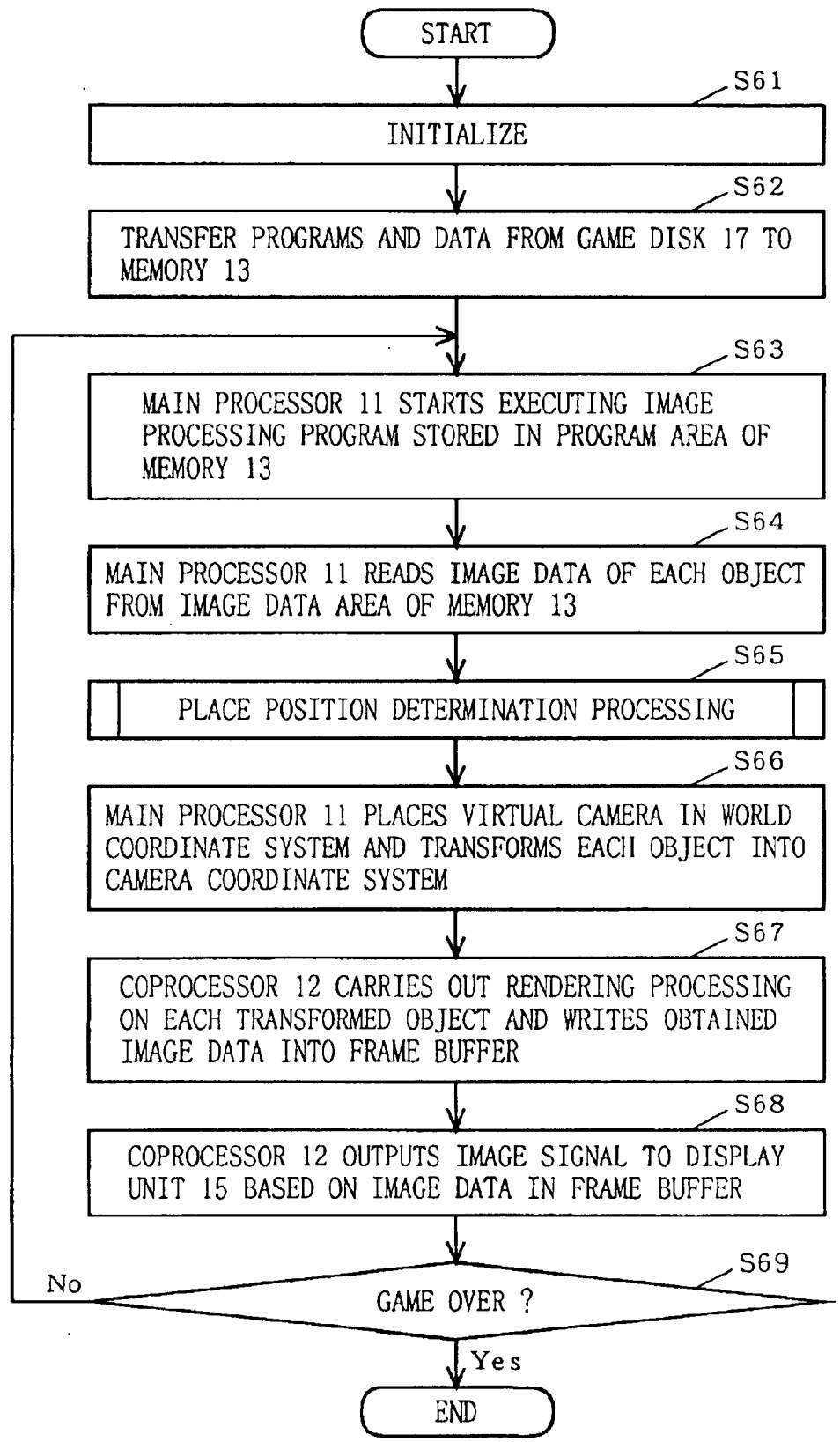
FIG. 6 is a flowchart for demonstrating the procedure how an image processing program is executed in the image processing apparatus according to one embodiment of the present invention.

FIG. 6 is a flowchart for demonstrating the procedure of executing the image processing program in the image processing apparatus according to the embodiment of the present invention. FIG. 7 is a flowchart for demonstrating the detailed procedure of step S65 of FIG. 6. FIG. 8 is a diagram for demonstrating the water surface object moving process.

With reference to FIG. 6, initialization is first carried out by a program that operates at the time of power on (step S61). In this initialization, whether the game disk 17 is set or not, whether the game controller 16 is connected or not, and others are detected. When initialization is completed, the required programs and data are transferred from the game disk 17 to the memory 13 (step S62). Next, the main processor 11 starts executing the image processing program stored in the program area of the memory 13 (step S63). From the object data storage area of the memory 13, data for each object (water surface object, land object, character, and others) is read (step S64). Then, the main processor 11 determines a place position of each read object on the world coordinate system (step S65).

Figure 7:
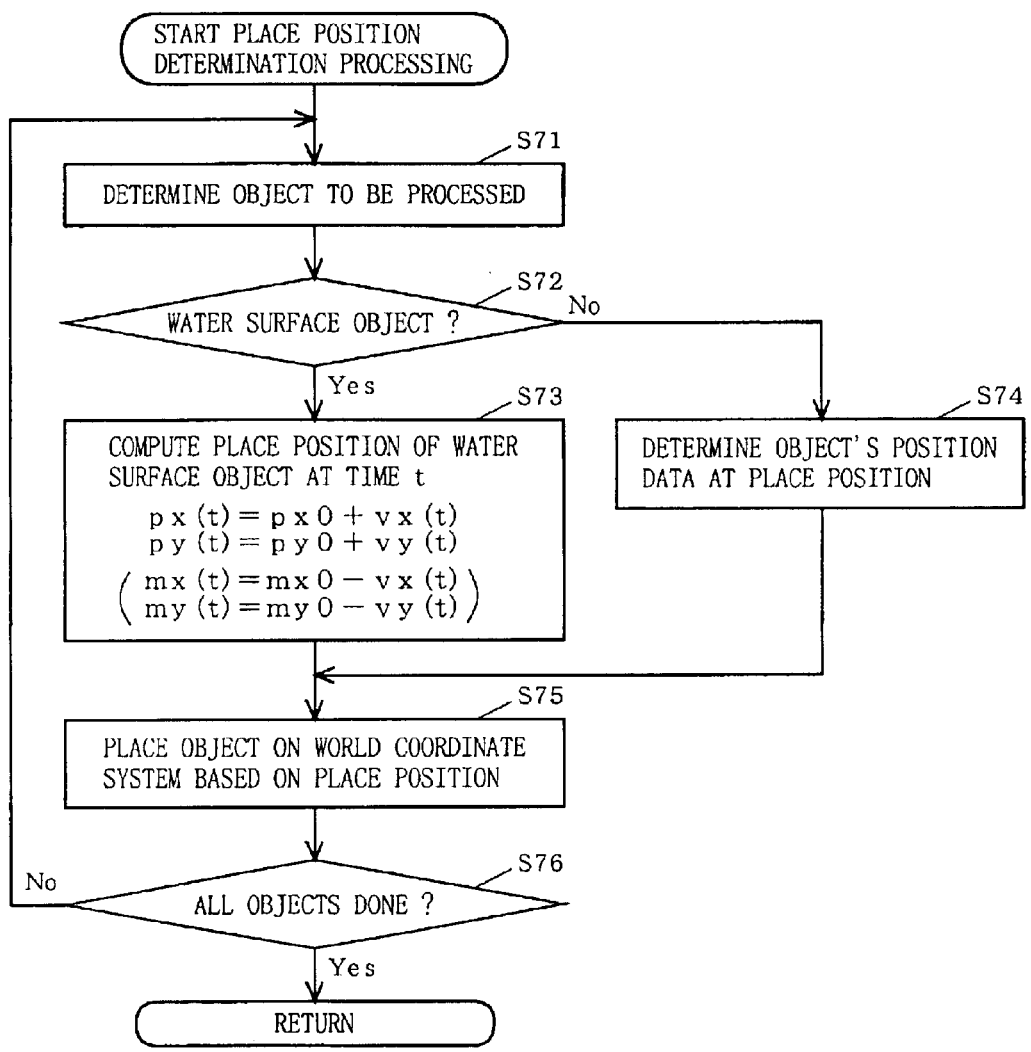
FIG. 7 is a flowchart for demonstrating the detailed procedure of step S65 of FIG. 6.

Here, with reference to FIG. 7, described in detail is place position determination processing carried out in the above step S65.

The main processor 11 determines, from a plurality of objects, an object to be processed (step S71). Next, the main processor 11 determines whether the determined object to be processed is a water surface object or not (step S72). Here, if determining that it is not a water surface object (it is a land object, character, or others) (step S72, No), the main processor 11 so determines as that position data for the read object indicates a place position (if it is a land object, a place position is determined by reading place position data of the land object from the object place data area of the memory 13 and, if it is a character, the place position is determined based on the operation of the game controller) (step S74), and the object to be processed is placed on the world coordinate system (step S75).

On the other hand, if determining it is a water surface object (step S72, Yes), the main processor 11 reads reference position data of the water surface object from the object place data area of the memory 13 and, with reference to the reference position data, computes a place position of the water surface object in the current time (frame) (step S73). Here, the main processor 11 computes the place position of the water surface object according to the following equations so that the position of the water surface object with reference to the land object sequentially moves in the predetermined area 2*d* at predetermined time (frame) intervals.

$$px(t)=px0+vx(t)$$

$$py(t)=py0+vy(t)$$

In the above equations, px0 and py0 are an X coordinate and a Y coordinate indicating a base position of the water surface object, that is, reference position data of the water surface object stored in the object place data areas of the game disk 17 and the memory 13. vx(t) and vy(t) is an X-direction moving amount and a Y-direction moving amount from the base position of the water surface object at time t. px(t) and py(t) are an X coordinate and a Y coordinate indicating a place position of the water surface object at the time t. Specifically, vx(t) is determined based on a predetermined function X(t) with the time t as a parameter, and vy(t) is determined based on a predetermined function Y(t) with the time t as a parameter.

Figure 8:
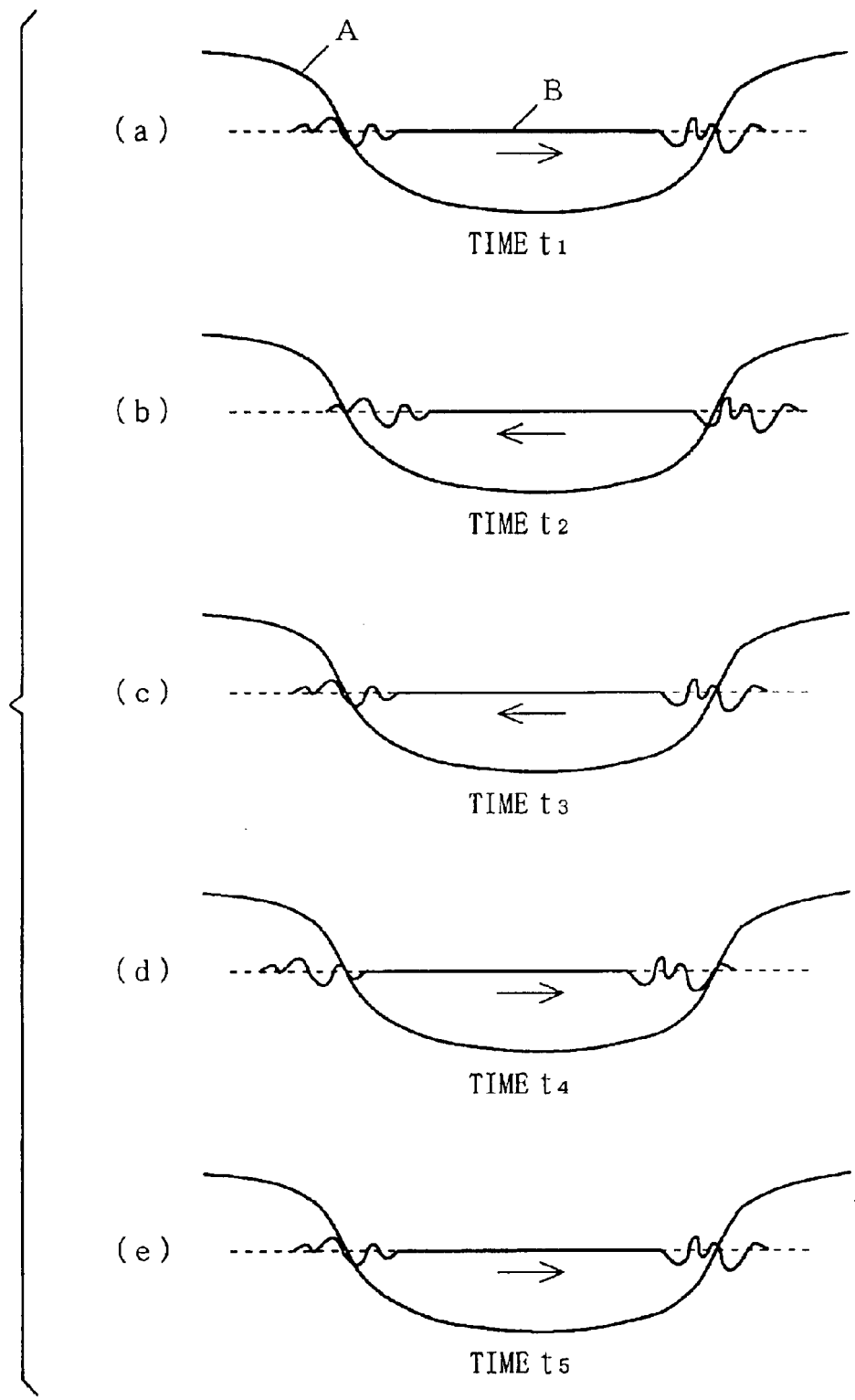
FIG. 8 is a diagram for demonstrating one example of how the place position of the water surface object shown in FIG. 4 moves in the progress of time t.
Figure 9A:
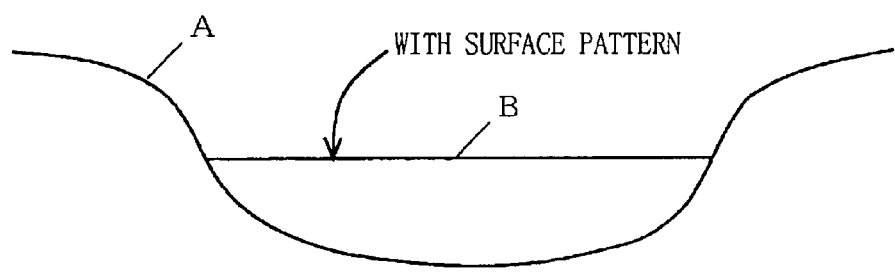
FIG. 9A and FIG. 9B are conventional examples of a water surface object and a land object represented in virtual three-dimensional space in vertical section.
Figure 9B:
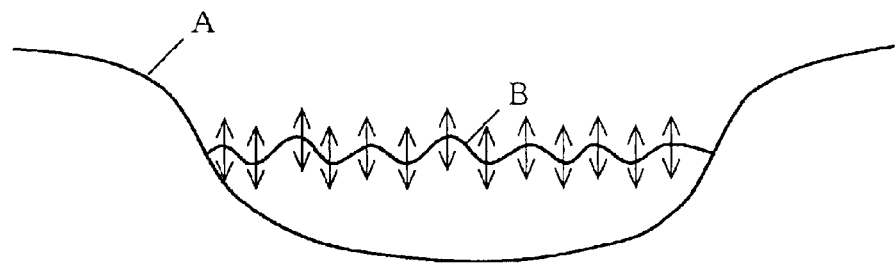

For example, when the function X(t) is set as "dCOS (ωt)" and the function Y(t) is set as "0", the water surface object B shown in (b) of FIG. 4 sequentially moves in place position (makes a back-and-forth slide motion in the X direction) as shown in (a) to (e) of FIG. 8, as the time t progresses (t1→t5). Furthermore, if the function Y(t) is also set as "dSIN(ωt)", the water surface object B moves in place position so that its trail draws a circuit.

In some cases, some pattern may be pasted on the surface of the water surface object. In such cases, if the above described processing for moving the place position of the water surface object is carried out, the pattern on the surface is also moved accordingly. Therefore, in the present invention, as in the following equations, for the water surface object with a pattern on the surface, the main processor 11 causes the pasting position of the pattern to move in a direction reverse to the direction of moving the object so as to be still (step S73).

$$mx(t)=mx0-vx(t)$$

$$my(t)=my0-vy(t)$$

In the above equations, mx0 and my0 are an X coordinate and a Y coordinate indicating a base position of the pattern pasted the water surface object. mx(t) and my(t) are an X coordinate and a Y coordinate indicating the pasting position of the pattern on the water surface object at the time t.

The main processor 11 then places the water surface object on the world coordinate system by following the position data computed by the above position computation processing (step S75). The place position determination processing in the above steps S71 to S75 is repeated for all objects drawn in one frame (step S76).

Note that, in the above example of FIG. 7, whether the object is a water surface object or not is determined for each object to be processed (step S72). Alternatively, such programming may be done in advance that, without this determination, all objects other than the water surface object are processed first, and then the water surface object is processed.

Referring back to FIG. 6, when the place positions of all objects on the world coordinate system are determined, the main processor 11 places, on the world coordinate system, a virtual camera corresponding to a viewpoint of a game player and, based on this virtual camera, transforms each object into a camera coordinate system (step S66). This transformation is realized by matrix transformation and two-dimensional coordinate transformation on the memory coordinates. Next, the coprocessor 12 carries out rendering processing on each object transformed into the camera coordinate system, and writes image data of each object into the frame buffer (step S67). Then, based on the image data written in the frame buffer, the coprocessor 12 outputs an image signal to the display part 15 (step S68).

The image processing in the above steps S63 to S68 is repeated until the game is over (step S69).

As described above, according to the image processing apparatus and the image processing program according to the embodiment of the present invention, a water surface object is so set as to be larger than a water surface area to be actually represented and to have undulations in the neighborhood of the boundary line portion meeting with a land object, and the place position is determined so that the position of the entire water surface object is moved. Thus, it is possible to change in shape only the boundary portion where the water surface and the land meet, and to represent undulations of the water surface as if water is undulating.

As such, in the present invention, the shapes of the polygons composing the water surface object are not individually changed, but the entire water surface object having a particular shape is moved. Therefore, the amount of computation in the image processing necessary for representing undulations of the water surface becomes small.

While the invention has been described in detail, the foregoing description is in all aspects illustrative and not restrictive. Needless to say, numerous other modifications and variations can be devised without departing from the scope of the invention.

What is claimed is:

1. An image processing apparatus that outputs image data for representing a water surface in virtual space, said apparatus comprising:
   a land object generator for generating a land object representing a land portion;
   a water surface object generator for generating a water surface object representing a water surface portion that is larger than a water surface area to be displayed and has a fixed undulating shape fixed to a predetermined area of said water surface object;
   an object placing portion for determining a place position of each object so that said water surface object meets said land object in a portion of said predetermined area;
   an object moving portion for moving the place position of said water surface object so that said portion meeting with said land object is changed within said predetermined area; and
   an image data outputter for outputting the image data for representing the virtual space with each placed object.

2. The image processing apparatus according to claim 1, wherein
   said object moving portion moves the place position of said water surface object so that said water surface object makes a linearly or curved, reciprocating motion.

3. The image processing apparatus according to claim 1, wherein
   said object moving portion moves the place position of said water surface object so that said water surface object makes a circular motion or an elliptical motion.

4. The image processing apparatus according claim 1, wherein
   said water surface object has a flat surface on a portion except said predetermined area, the portion not meeting with said land object.

5. The image processing apparatus according to claim 1, wherein
   when a pattern is pasted on a surface of said water surface object,
   said object moving portion moves a pasting position of the pattern in a direction reverse to a direction of moving said water surface object by an amount equal to an amount of moving said water surface object.

6. An image processing program stored on a computer-readable medium for executing, on a computer, a procedure of outputting image data for representing a water surface in virtual space, said program comprising:

a land object generating step of generating a land object representing a land portion;

a water surface object generating step of generating the water surface object representing a water surface portion that is larger than a water surface area to be displayed and has a fixed undulating shape fixed to a predetermined area of said water surface object;

a determining step of determining a place position of each object so that said water surface object meets said land object in a portion of said predetermined area;

a moving step of moving the place position of said water surface object so that said a portion meeting with said land object is changed within said predetermined area; and an outputting step of outputting the image data for representing the virtual space with each placed object.

7. The image processing program according to claim 6, wherein said moving step moves the place position of said water surface object so that said water surface object makes a linearly or curved, reciprocating motion.

8. The image processing program according to claim 6, wherein said moving step moves the place position of said water surface object so that said water surface object makes a circular motion or an elliptical motion.

9. The image processing program according to claim 6, wherein, said water surface object has a flat surface on a portion except said predetermined area, the portion not meeting with said land object.

10. The image processing program according to claim 6, wherein when a pattern is pasted on a surface of said water surface object, said moving step moves a pasting position of the pattern in a direction reverse to a direction of moving said water surface object by an amount equal to an amount of moving said water surface object.

* * * * *